Aug. 15, 1961  P. L. CIACCIO  2,995,944
CHANGEABLE RATIO BELT TRANSMISSION POWER DRIVE
Filed Nov. 3, 1958  2 Sheets-Sheet 2

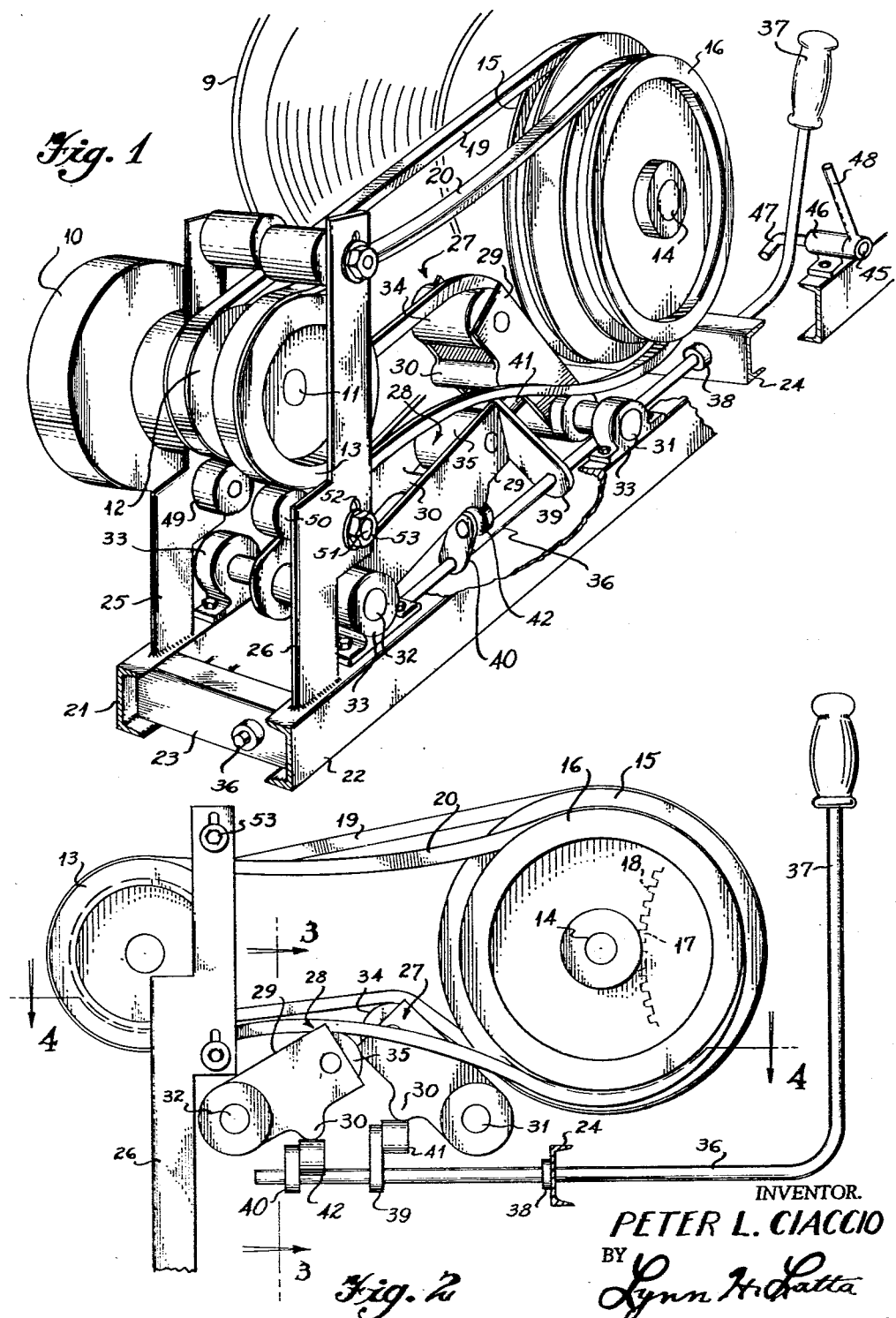

INVENTOR.
PETER L. CIACCIO
BY
Lynn H. Latts
ATTORNEY

2,995,944
CHANGEABLE RATIO BELT TRANSMISSION POWER DRIVE
Peter L. Ciaccio, 9059 Venice Blvd., Los Angeles 34, Calif.
Filed Nov. 3, 1958, Ser. No. 771,444
2 Claims. (Cl. 74—217)

This invention relates to changeable speed ratio power drives and has as its general object to provide a simplified, improved change speed drive mechanism for the transmission of power in small industrial machines such as sewer cleaning apparatus (e.g. winches for hoisting drag buckets out of manholes) etc. The particular object is to provide a change speed transmission which utilizes relatively inexpensive belt drives rather than spur gearing for transmitting variable ratio drive.

Another object is to provide a change speed transmission providing a slipping clutch effect during the change from one speed ratio to another.

A still further object is to provide a change speed transmission utilizing a pair of belts traveling over respective pairs of pulleys for transmitting drive at different ratios between a driving shaft and a driven shaft, together with means operated by a single control lever for selectively tightening one belt while loosening the other so as to establish a drive through one of the belts while the other remains inoperative.

Other objects and advantages will become apparent in the ensuing specification and appended drawing in which:

FIG. 1 is a perspective view of a change speed transmission embodying the invention;

FIG. 2 is a side view thereof;

Figure 4:
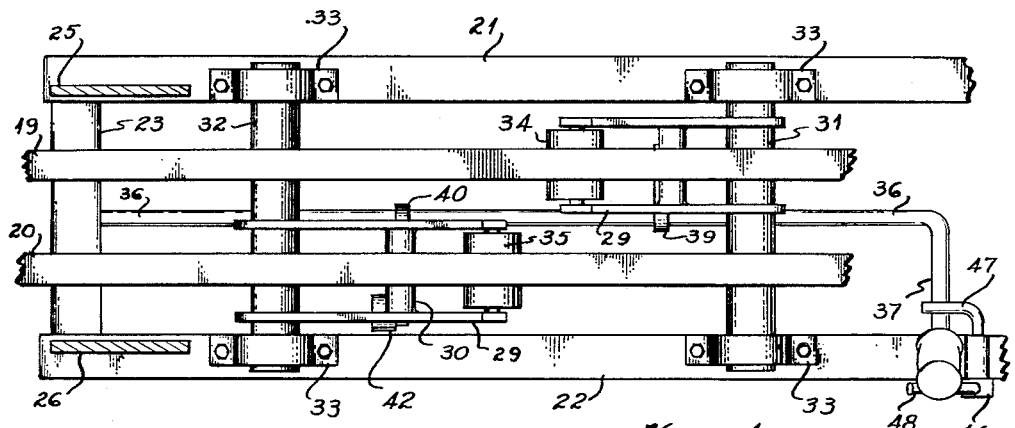
FIG. 4 is a horizontal sectional view taken on the line 4—4 of FIG. 2.
Figure 3:
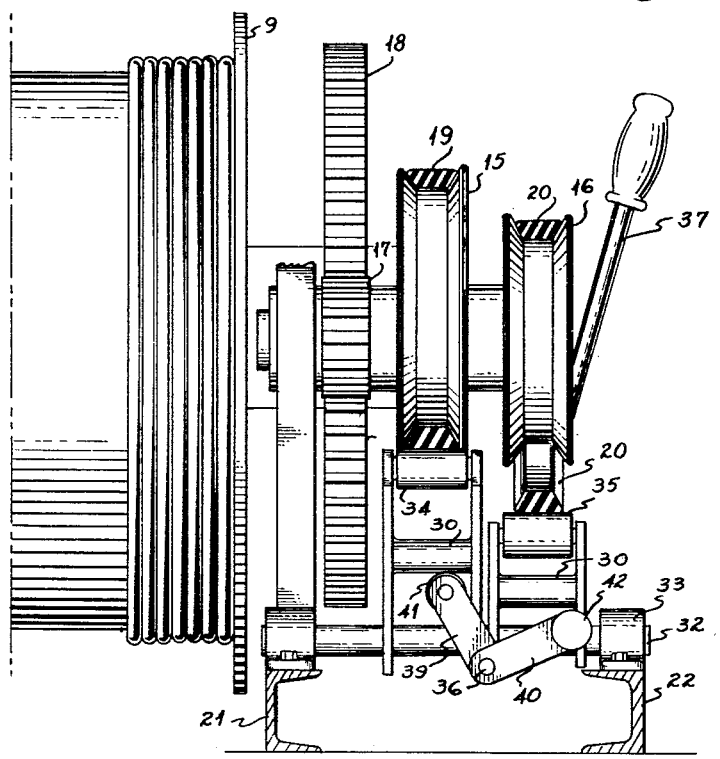
FIG. 3 is a transverse sectional view taken on the line 3—3 of FIG. 2.

Referring now to the drawings in detail, I have shown therein, as an example of one form in which the invention may be embodied, a change speed transmission wherein power from a motor (e.g. gasoline engine) is transmitted through a clutch 10 and an input shaft 11 to a pair of drive pulleys 12 and 13, both pulleys being secured to the shaft 11 so as to be constantly driven thereby; and wherein a driven shaft 14, carrying a pair of driven pulleys 15 and 16, both secured thereto, is adapted to transmit the drive to a driven part (such as a winch drum 9) through any suitable power delivery means such as a spur pinion 17 secured on shaft 14 and a bull gear 18 meshing with and driven by pinion 17 and directly coupled to the winch drum or other driven part.

The pulleys 12 and 15 are connected by a drive transmitting belt 19. The pulleys 13 and 16 are connected by a second belt 20. Pulley 16 is of smaller diameter than pulley 15 whereas pulley 13 is of larger diameter than pulley 12, and thus the drive through belt 19 is a slower drive than through belt 20.

Any suitable frame structure may be utilized for supporting the mechanism. For example, a pair of longitudinal bed rails 21 and 22 may be connected by cross members 23 and 24 and may support suitable super structure including, for example, posts 25 and 26 (most of the super structure is omitted from the drawing to avoid obscuring the more important components of mechanism). The input shaft 11 and driven shaft 14 may be journalled in suitable bearings carried by the super structure.

Belts 19 and 20 are controlled by belt tightener units 27 and 28, the tightener unit 27 cooperating with belt 19 and the unit 28 cooperating with belt 20. Each of these units include a yoke of H-form comprising spaced side arms 29 and an intermediate cross-bar 30 integrally connecting the arms 29 intermediate the ends thereof. The cross bars 30 function as bearing members against which lifting rollers may operate. At their lower ends, the yokes are mounted for swinging movement upon respective shafts 31 and 32 which in turn may be mounted in pillow blocks 33 secured upon the rails 21 and 22. Journalled between the upper ends of arms 29 are respective rollers 34 and 35 which bear against the lower stretches of the respective belts 19 and 20. The belt tightener units 27 and 28 are in staggered relation to one another transversely of the apparatus so as to be centered below their respective belts.

The belts are selectively tightened by simultaneously raising one of the tightener units while lowering the other. This is accomplished by oscillating an actuator shaft 36 by means of a crank lever 37 on one end thereof, the shaft 36 being suitably journalled in bearings 38 in cross members 23, 24. Secured to the actuator shaft 36 are a pair of actuator arms or levers 39 and 40 having respective rollers or bearing means 41 and 42 which are in supporting engagement with the respective cross bars 30 of the respective belt tightener units 27 and 28 and arcuately movable for raising and lowering the same.

Actuator arms 39 and 40 are arranged so as to project upwardly from shaft 36 in diverging relation, the arm 39 being inclined upwardly and leftwardly and the arm 40 being inclined upwardly and rightwardly as viewed from the near end of the machine seen in FIG. 1. Consequently, as the crank lever 37 is shifted to rotate the shaft 36 clockwise as viewed from that end of the machine, the arm 39 will be raised, causing its roller 41 to lift the belt tightener unit 27 (rolling transversely along the transverse length of cross-bar 30 on the underside thereof as it does so) while the arm 40 will be lowered, allowing the belt tightening unit 28 to shift downwardly. Consequently, the belt 19 will be tightened while the belt 20 is relaxed. An opposite movement of shaft 36 will raise the unit 28 and lower the unit 27, tightening the belt 20 and slackening the belt 19.

The shaft 36 may be locked in the position in which belt 19 is tightened by actuating a latch 45 rotatably mounted in a bearing 46 on rail 22, latch 45 having a hooked latch finger 47 which, when lowered, will engage behind the lever 37 to hold it in the position in which arm 39 is raised. A handle 48 on latch 45 is used to actuate the same. When latch finger 47 is raised to an upstanding position, it will clear the lever 37 and free the latter for shifting movement to its alternate position for tightening belt 20.

Mounted on posts 25 and 26 are respective idler rollers 49 and 50. These rollers are rotatably mounted on trunnions 51 which extend through vertical slots 52 in posts 25 and 26 and are locked thereto by locknuts 53, whereby the idler rollers 49 and 50 may be raised and lowered for adjustment thereof to positions engaging the respective belts 19 and 20 beneath the pulleys 12 and 13 with just the right snugness to secure the belts against flopping free from the pulleys, without creating any appreciable drag on the belts.

The tightening units 27 and 28 are sufficiently staggered laterally to clear one another in their raising and lowering movements. Preferably, they are arranged to extend toward one another in opposite directions from their respective fulcrum shafts 31 and 32, since that provides the most compact arrangement wherein the actuator arms 39 and 40 may operate against their respective tightener units without interference.

One of the advantages of the invention resides in the dual functioning of the belts 19 and 20 to transmit drive of different speed ratios and to protect the drive during shifting movement with a slipping-cutching effect supplementing that of clutch 10 or, in some cases making it possible to eliminate a friction clutch between the motor and the input shaft 11. Another advantage of the invention resides in the fact that with the shift roller 37 in an intermediate position between its two limit positions, both of the belt tighteners 27 and 28 may simultaneously occupy a neutral position wherein the drive in both belts is relaxed, providing a "neutral" non-driving position between the two driving positions.

The actuator arms 39, 40 and rollers 41, 42 may be regarded broadly as camming devices and are referred to generally in some of the claims as cam means.

I claim:

1. In a change speed transmission: an input shaft; a driven shaft; an elongated frame in which said shafts are journalled on parallel tranverse axes spaced from one another longitudinally of said frame; a pair of drive pulleys secured on said input shaft to receive drive therefrom; a pair of driven pulleys secured on said driven shaft for transmitting drive thereto; a pair of belts each trained around respective aligned pulleys, the pulleys being of different diameters such that the belts will transmit drives of different ratios; a pair of belt tightener units arranged in registering relation to the respective belts and in offset relation to one another transversely of said frame, each of said units comprising an arm having one end pivoted to the frame on a transverse axis, each arm having, intermediate its ends, a transverse bearing member parallel to its said axis, and each arm having at its free end, a roller for engaging a respective belt; the respective pivot axes of said tightener units being spaced from one another longitudinally of said frame and their said arms projecting generally toward one another from said respective pivot axes in transversely offset relation to one another for swinging movement in the planes of the respective belts toward and away from the respective belts between respective belt tightening and belt loosening positions; and actuator means comprising an actuator shaft journalled in the frame on an axis extending longitudinally thereof and transverse to said pivot axes of the tightener units, means for rotating said actuator shaft, and actuator levers secured to said shaft and radiating therefrom in diverging relationship, said actuator levers having free ends provided with bearing means engageable with the respective bearing members of said tightener units for transmitting swinging movement to said belt tightener units in response to rotation of said actuator shaft, the diverging relationship of said actuator levers being such that while one of the levers is moving its respective tightener unit in belt tightening direction the other lever will be backed away from its respective belt tightener unit to permit the latter to move in belt loosening direction.

2. In a change speed transmission: an input shaft; a driven shaft parallel thereto; an elongated frame including a base and a superstructure in which such shafts are journalled on parallel axes above said base and spaced from one another longitudinally of said frame; a pair of drive pulleys secured on said input shaft to receive drive therefrom; a pair of driven pulleys aligned with the respective drive pulleys and secured on said driven shaft for transmitting drive thereto; a pair of belts each trained around respective aligned pulleys, the pulleys being of different diameter such that the belts will transmit drives at different ratios; a pair of belt tightener units comprising respective arms arranged in parallel registering relation to respective belts and in offset relation to one another transversely of said frame, each of said arms having one end pivoted to said base on a transverse axis below a respective pair of pulleys and parallel to the axis thereof, said arms having respective free ends inclined upwardly and toward one another in the space between said pairs of pulleys, each arm having, intermediate its ends, a transverse bearing member parallel to its said transverse axis and each arm having at its free end, a roller for engaging beneath the lower stretch of a respective belt; said arms being transversely offset for vertical swinging movements in the planes of the respective belts, clearing one another, and actuator means comprising an actuator shaft journalled in said frame on an axis parallel to said longitudinal axis thereof, extending beneath one of said pairs of rollers and between said transverse arm axes, a crank handle on one end of said actuator shaft for rotating the same in the base, and a pair of actuator levers secured to said shaft and radiating upwardly therefrom in transversely diverging relationship, said actuator levers having free upper ends provided with bearing means engageable with the respective bearing members of said tightener unit arms for transmitting swinging movement to said arms in response to rotation of said actuator shaft, the diverging relationship of said actuator levers being such that while one of said levers is moving its respective tightener units upwardly for belt tightening action, the other lever will move downwardly to loosen its respective belt.

References Cited in the file of this patent

UNITED STATES PATENTS

| 881,086 | Stevens | Mar. 3, 1908 |
| 1,216,749 | Thurlow | Feb. 20, 1917 |
| 2,632,335 | Ciaccio | Mar. 24, 1953 |